United States Patent [19]
Champenois

[11] 4,093,793

[45] June 6, 1978

[54] COPOLYMERS OF ANTHRAQUINONE DYES AND ACRYLAMIDE

[75] Inventor: Michel Maurice Luce Champenois, Le Mesnil Esnard, France

[73] Assignee: Produits Chimiques Ugine Kuhlmann, Paris, France

[21] Appl. No.: 601,010

[22] Filed: Aug. 1, 1975

[30] Foreign Application Priority Data

Feb. 8, 1974 France .................. 74 26846

[51] Int. Cl.² .......................................... C08F 212/32
[52] U.S. Cl. ........................... 526/221; 260/79.3 M; 260/465 R; 260/875; 260/883; 260/895; 526/11.1; 526/280; 526/284; 548/301; 548/307
[58] Field of Search ............. 260/80.3 N, 85.5 R, 260/85.5 A, 78.5 N, 79.3 M, 875, 883; 526/280, 284, 221, 11.1

[56] References Cited

U.S. PATENT DOCUMENTS

| | | | |
|---|---|---|---|
| 2,620,324 | 12/1952 | Coover et al. ................... | 260/883 |
| 2,805,218 | 9/1957 | Towne et al. .................... | 260/883 |
| 2,895,967 | 7/1959 | Staley et al. ..................... | 260/883 |
| 2,976,294 | 3/1961 | Firestine ......................... | 260/85.5 A |
| 3,503,087 | 3/1970 | Wolf et al. ....................... | 260/80.3 N |
| 3,637,596 | 1/1972 | Gulbins et al. .................. | 260/85.5 R |

*Primary Examiner*—Harry Wong, Jr.
*Attorney, Agent, or Firm*—Beveridge, DeGrandi, Kline & Lunsford

[57] ABSTRACT

Copolymers of acrylamide and dyes, usable as prepolymers for the preparation of structurally dyed macromolecular materials. The dyes have a polymerizable double bond, such as maleimido, acryloylamino or cyanovinyl groups.

4 Claims, No Drawings

COPOLYMERS OF ANTHRAQUINONE DYES AND ACRYLAMIDE

The invention has for its object copolymers of dyes and acrylamide, that can be used for fabrication of structurally dyed macromolecular materials and wherein the dye forms an integral part of the macromolecular chain.

It is known how to copolymerize monomers such as styrene, acrylonitrile, vinyl chloride, vinyl acetate, and the like, with dyes having groups able to take part in a polymerization reaction. In general, these dyes are slightly soluble in water or in the respective monomers and their reactivity is rather slight. Copolymerization of the dyes and monomers requires temperatures and reaction times much higher than polymerization of the base monomers alone. On the other hand, the amounts of dyes effectively included in the macromolecular chains can, in certain cases, be extremely slight.

Now, it has been found, according to the present invention, that it is possible to obtain structurally dyed macromolecular materials, with considerable reaction speeds at low temperature and with good color yields, by using copolymers of acrylamide and dyes for copolymerization with base monomers. The acrylamide makes it possible to solubilize dyes and facilitates further copolymerization.

Any dye having a polymerizable double bond can be used. As such there can be cited, among others, the dyes having maleimide, acryloyamino and cyanovinyl groups. Such dyes can belong to the most diverse classes, such as azo, anthraquinone, phthalocyanine, etc. dyestuffs.

There is a large number of known dyes having a polymerizable double bond. Certain new dyes have proven to be particularly advantageous for preparation of polymers that can be used for the fabrication of macromolecular materials according to the invention.

They can be represented by the following formulas:

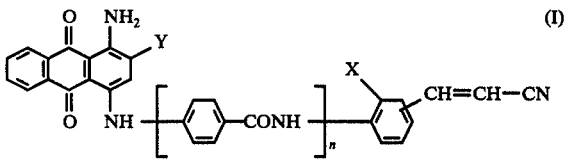
(I)

wherein Y represents a hydrogen atom or a sulfo group, X represents a hydrogen or chlorine atom, $n$ represents 0 or 1, and the cyanovinyl group is in position 3, 4 or 5;

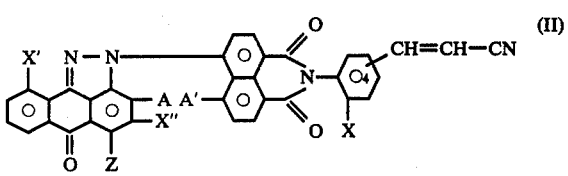
(II)

wherein X, X', X" represent hydrogen or halogen atoms, Z represents a hydrogen atom, a lower alkyl group or a benzamido group, the cyanovinyl group is in position 3, 4 or 5, A represents a hydrogen or halogen atom or lower alkyl group, A' represents a hydrogen atom, and AA' can be a covalent bond.

The dyes of formula (I) can be prepared by causing the reaction, by the well-known method, of an anthraquinone of the general formula:

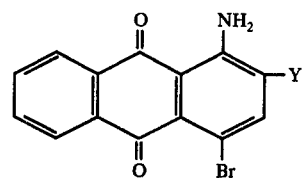

with an amine of the general formula:

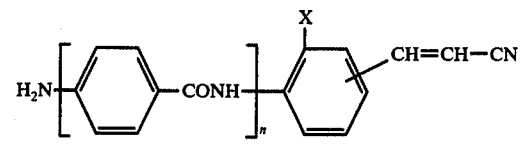

X, Y, $n$ having the same significations as in formula (I).

The dyes of formula II can be prepared by condensation of 4-bromo naphthalic anhydride with an amine of the general formula:

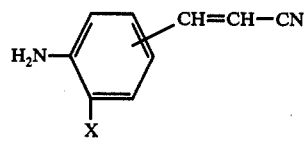

and the reaction of the naphthalimide thus obtained with a pyrazolanthrone of the formula:

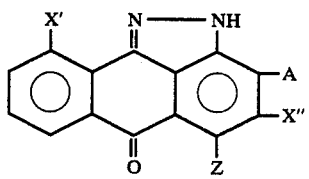

A, A', X, X', X" and Z have the same significations as in formula (II). When A represents a halogen atom, the 4-(2-halogeno pyrazolanthronyl) N-(3, 4 or 5-cyanovinyl phenyl) naphthalimides obtained can be subjected to a further ring closure by elimination of halohydric acid in a sulfuric medium.

Of the monomers that can be used to prepare the macromolecular materials by copolymerization with dyed prepolymers there can be cited vinyl monomers such as vinyl chloride and vinyl acetate, styrene, acrylic acid and its derivatives; acrylates and acrylonitrile. They can be used alone or in mixture.

The amounts of dyes and acrylamide used to prepare the prepolymers are selected in consideration of the intended purpose of the prepolymers. If they are intended for preparation of macromolecular materials directly usable, for example, for fabrication of yarns or molded objects, the proportions of acrylamide can vary from 0.5% to 50% by weight in relation to the base monomers to be dyed; the proportions of dyes can vary from 0.1 to 2%.

If the prepolymers are intended for preparing macromolecular materials used, as master mixtures, for dyeing in the mass of synthetic fibers and resins, the proportions of dye can vary from 2 to 25% and those of acrylamide from 0.5 to 50% by weight in relation to the monomers used. Thus, the proportion of dye can vary on the whole from 0.1 to 25 percent by weight in relation to the monomers used.

Copolymerization of the dyes with acrylamide is performed according to known techniques of acrylamide polymerization, preferably in the presence of a tetravalent cerium complex.

The macromolecular materials dyed by means of these prepolymers have perfectly uniform, bright and stable colourations. The process according to the invention, which can be applied to very different types of dyeing structures, makes it possible to obtain copolymers with very varied shades. The inclusion of dyes as integral parts of the chains was showed on the one hand, by infrared spectrography and nuclear magnetic resonance spectrography and, on the other hand, by the impossibility of separating the dye from the polymer support by solvents.

The following examples, in which unless indicated to the contrary, the parts indicated are by weight, illustrate the invention without limiting it.

EXAMPLE 1

There are mixed, cold, with stirring, 3.2 parts of 2-bromo 1,4-diamino anthraquinone, 100 parts of maleic anhydride and 100 parts of acetic anhydride. After 10 minutes of stirring, there are added 30 parts of sodium acetate and it is brought to reflux. The reaction product is then poured into water under very vigorous stirring. There are obtained, after filtering, washing and drying, 37 parts of a violet brown product whose analysis shows that it is 1-maleimido 2-bromo 4-amino anthraquinone.

Into a solution, kept at 35° C, containing 2 parts of glucose, 2 parts of acrylamide, and 150 parts of water is introduced 0.5 part of dye prepared as above. After desoxygenation of the solution by passage of a nitrogen current, there is rapidly introduced with stirring, 0.5 part of cerium (IV) and ammonium nitrate in solution in 5 parts of water acidified by nitric acid. After 1 minute, there are introduced 20 parts of acrylonitrile (propenenitrile) and the reaction is continued for a half hour. There are obtained 5 parts of a violet brown polymer whose colouration remains stable after 48 hours of extraction with methylene chloride with reflux and whose intrinsic viscosity is 6.3 dl.g$^{-1}$ in dimethylformamide at 25° C.

EXAMPLE 2

Operating according to the process of Example 1, but with 2-acryloylamino anthraquinone as the dye, there are obtained 6.5 parts of orange polymer with intrinsic viscosity 5.7 dl.g$^{-1}$ in dimethylformamide at 25° C.

EXAMPLE 3

Into 60 parts of water are added 5.8 parts of 1-bromo 3-sulfo 4-amino anthraquinone, 5.2 parts of [N(4-cyanovinyl phenyl)4-carboxamido] aniline, 1.5 parts of anhydrous sodium carbonate, 5 parts of sodium bicarbonate and 0.5 part of cuprous chloride. The mixture is heated for 20 hours under nitrogen at 65° C. The precipitate is filtered, washed, taken up with acidified water at 70° C, filtered, washed and dried.

Into a reactor having a thermostat and provided with an agitation device and a nitrogen intake tube are placed 50 parts of water, 2 parts of glucose, 0.5 part of dye obtained above, N,[N(4-cyanovinyl phenyl)4-carboxamido phenyl] 1,4-diamono-3-sulfo anthraquinone, and 5 parts of acrylamide. The mixture is heated at 40° C under nitrogen and 0.5 part of cerium (IV) and ammonium nitrate is introduced. Polymerization is allowed to continue for 2 minutes and there are rapidly introduced 20 parts of acrylonitrile and 25 parts by volume of vinyl acetate. The mixture is subjected to agitation for an hour and then the excess monomers are distilled under vacuum; the blue polymer obtained is filtered, washed and dried.

EXAMPLE 4

Into 250 parts of anhydrous nitrobenzene are added 15 parts of pyrazolanthrone, 14 parts of anhydrous potassium carbonate, 27.5 parts of 4'-bromo 4-naphthalimido cinnamonitrile and 2 parts of cuprous chloride. The mixture is brought to reflux for 16 hours. After cooling, it is filtered; the precipitate is taken up in acidified water by boiling, filtered and dried. There are obtained 32 parts of the dye of the formula:

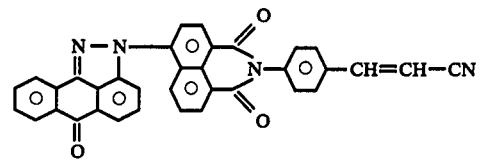

This dye is made to react with acrylamide according to the process described in Example 3. A dark green copolymer with perfectly uniform colouration is obtained.

This product, incorporated into a polyacrylonitrile dimethyl formamide collodion, makes it possible to obtain, according to known methods, yarns of polyacrylonitrile of green colouration that is particularly homogeneous.

What is claimed is:

1. A structurally dyed water-insoluble macromolecular material containing, in copolymerized form, acrylamide, at least one colorless monomer selected from the group consisting of vinyl chloride, vinyl acetate, styrene, acrylic acid, acrylates and acrylonitrile and at least one anthraquinone dye having a group containing a polymerizable double bond, obtained by reacting for one to two minutes, in an aqueous medium and in the presence of a tetravalent cerium complex, the dye with the acrylamide and then introducing in the medium said colorless monomer and continuing the polymerization, the amount of dye being from 0.1 to 25% by weight of the colorless monomer and the amount of acrylamide being from 0.5 to 50% by weight of the colorless monomer.

2. A structurally dyed water-insoluble macromolecular material as defined in claim 1 wherein said group of anthraquinone dye is a member selected from the group consisting of maleimido, acryloylamino and cyanovinyl.

3. A structurally dyed macromolecular material as defined in claim 2 wherein said group of anthraquinone dye is a cyanovinyl group.

4. A structurally dyed macromolecular material as defined in claim 3 wherein said anthraquinone dye is a dye of the general formula:

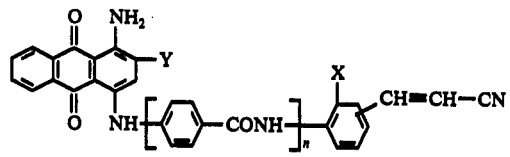

wherein Y represents a hydrogen atom or a sulfo group, X represents a hydrogen or chlorine atom, n represents 0 or 1, and the cyanovinyl group is in position 3, 4 or 5.

* * * * *